UNITED STATES PATENT OFFICE.

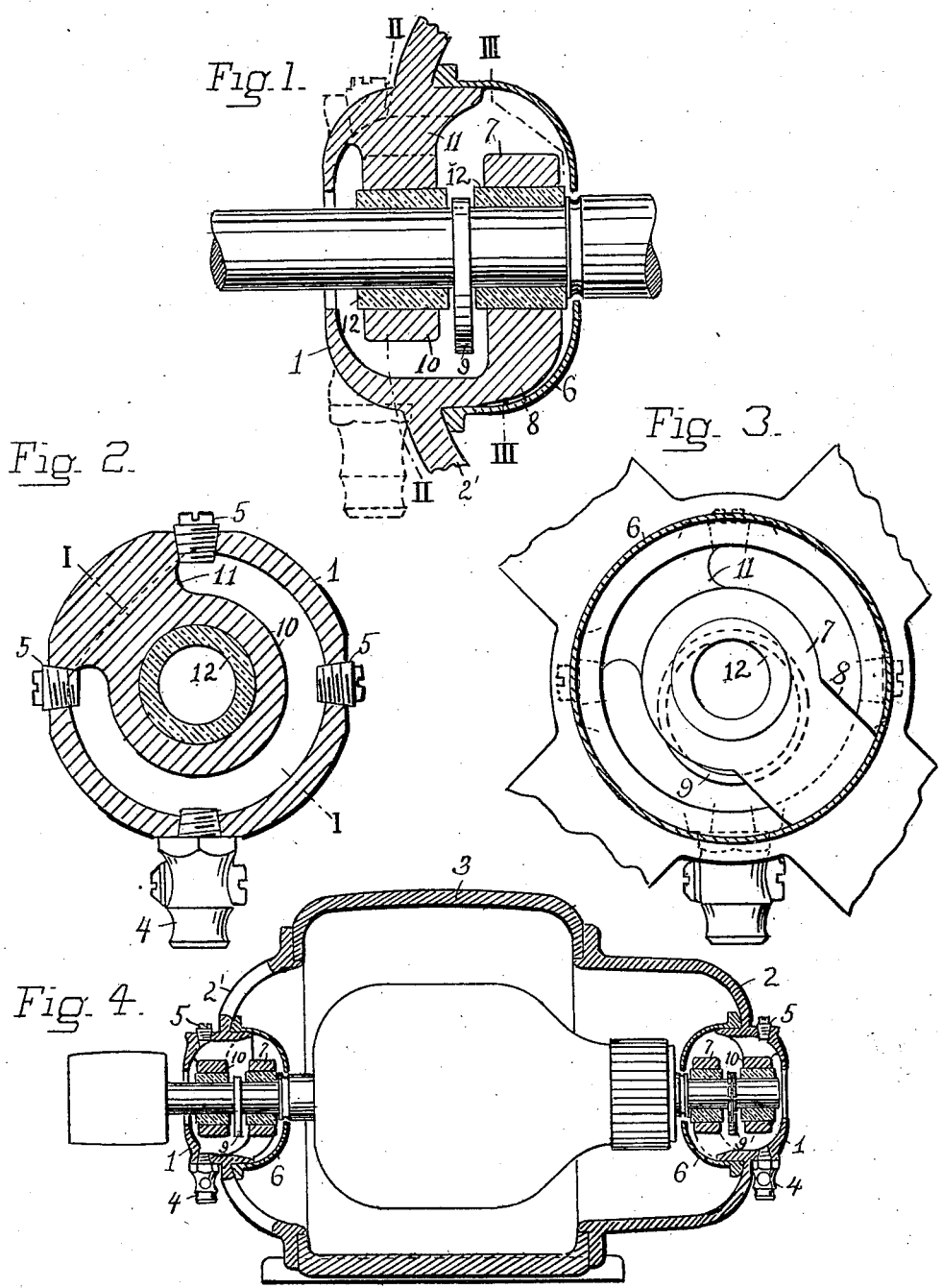

ROBERT BELDEN TREAT, OF NEWARK, NEW JERSEY, ASSIGNOR TO CROCKER-WHEELER COMPANY, OF AMPERE, NEW JERSEY, A CORPORATION OF NEW JERSEY.

SELF-OILING BEARING.

No. 880,428.  Specification of Letters Patent.  Patented Feb. 25, 1908.

Application filed June 10, 1905. Serial No. 264,601.

*To all whom it may concern:*

Be it known that I, ROBERT BELDEN TREAT, a citizen of the United States of America, and a resident of Newark, county of Essex, and State of New Jersey, have invented certain new and useful Improvements in Self-Oiling Bearings, of which the following is a specification.

My invention relates to the construction of self-oiling horizontal bearings. The bearing is surrounded by an oil-chamber which lies between a supporting part for the bearing and a cap. The oiling is effected by an oil-conveying ring or chain which rests on the shaft at the end of the bearing and dips into the oil in the chamber.

The object of the invention is to produce a bearing of simple and substantial construction in which the chambered supporting part and bearing or support for the bearing-bushing may be integral, and that when a plurality of bearings are provided in the oil-chamber different bearings are supported from different sides of the chamber so that a machine provided with the bearings may be placed in different positions, and in whatever position it may be placed or suspended the oil-chamber will hold a sufficient amount of oil in proper relation to the shaft and the oil-ring or chain will assume its proper position.

A further object of the invention is to provide a passageway between the supporting part and the bearing for the introduction or removal of the oil-conveying ring or chain.

A further object of the invention is to so arrange the bearing with respect to the frame that the cap may be on the side facing the interior of the machine and the support will be formed in an outwardly projecting hub, through which oil-holes can be drilled where they will be accessible for the introduction and removal of oil, though I do not limit myself to this arrangement.

The bearing is of a solid type as distinguished from that type of bearing which is split along a plane through or parallel with the axis of the bearing.

In the accompanying sheet of drawings which forms a part of this application,—Figure 1 is a section through a bearing embodying my invention on the oblique line I—I of Fig. 2. with the modified appearance of a vertical section indicated by dotted lines. Fig. 2 is a section through the bearing on the line II—II of Fig. 1. Fig. 3 is a section on the line III—III of Fig. 1. Fig. 4 is a vertical section through an electric machine which is provided with bearings in accordance with my invention.

The illustrated application of the bearing shows a chambered supporting part 1 which is located at the middle of a plate 2 or spider 2' with arms. The plate or spider is bolted to a magnet frame 3 of a dynamo-electric machine or electric motor and forms part of the inclosing framework of the machine. The chamber faces the interior of the machine and lies in a hub which is on the outer side of the plate. The hub is drilled through for the introduction of the oil with four equally spaced holes to provide for four positions or suspensions of the machine. A draw-off cock 4 is screwed into the lowermost hole for the removal of oil and plugs 5 5 5 are screwed into the other three holes, the uppermost plug being removed when oil is to be introduced into the bearing. By this arrangement the machine may be suspended from wall or ceiling as well as positioned with its feet on the underside as illustrated, the draw-off cock being shifted to whichever hole is on the under side. A cap 6 on the side of the plate next the machine closes the chamber in the hub of the supporting part, and the chamber in the cap with the chamber in the supporting part together form an oil chamber.

A bearing 7 is supported within the oil-chamber from one side of the supporting part of the oil chamber by means of a connecting part 8. The bearing and connecting part are preferably cast in one piece with the supporting part. Otherwise the bearing is unconnected with the walls of the chamber and is spaced therefrom sufficiently for passing an oil-conveying ring which may be a rigid circular ring 9 or a flexible ring or chain 9' between the walls of the chamber and the bearing into its operative position at the end of the bearing and within the chambered supporting part.

A second bearing 10 is preferably placed at one end of the bearing 7 and supported similarly to bearing 7. Both bearings are inclosed within the oil-chamber and supported from the walls of the chamber. A connecting part 11 connects this bearing with the chamber and lies on a different side of the axis of the bearing 10 from the connecting part of bearing 7. The oil-conveying ring or chain lies between the two bearings. Both bearings contain bushings 12 12.

The holes for the bushing are drilled slightly tapering so that the bushings may be driven into place and require no other force than friction to hold them, though I do not limit myself to this construction.

What I claim as new, and desire to secure by Letters Patent of the United States, is:

1. The combination in a shaft-bearing, of a chambered supporting part, a cap covering the chambered supporting part forming a chamber with the chambered supporting part, a bearing arranged within the chamber, means for supporting the bearing from the supporting part, and an oil-conveying ring, the chambered part and bearing being so formed and arranged as to leave a passageway for inserting the oil-conveying ring between the bearing and the sides of the chambered part, substantially as described.

2. The combination in a shaft-bearing, of a chambered supporting part, a cap covering the chambered supporting part forming a chamber with the chambered supporting part, a plurality of bearings within the chamber, means for supporting the bearings from different sides of the supporting part, and an oil-conveying ring located between the bearings, the chambered part and bearings being so formed and arranged as to leave a passageway for the insertion of the oil-conveying ring between the bearings, substantially as described.

Signed by me at East Orange, New Jersey, this 9th day of June, 1905.

ROBERT BELDEN TREAT.

Witnesses:
GANO S. DUNN,
EDWIN R. DOUGLAS.